United States Patent Office 3,801,673
Patented Apr. 2, 1974

3,801,673
PROCESS FOR PREPARING POLYCARBONATE ALLOYS
William J. J. O'Connell, Evansville, Ind., assignor to General Electric Company
No Drawing. Filed Jan. 3, 1972, Ser. No. 215,151
Int. Cl. C08g 39/10
U.S. Cl. 260—873          7 Claims

ABSTRACT OF THE DISCLOSURE

A process for preparing an alloy of a polycarbonate and an olefin polymer. The process involves melt blending two polymers having melt viscosities within 50 percent of each polymer at the temperature and shear rate employed for melt blending.

---

This invention relates to a process for preparing polycarbonate alloys which are homogeneous mixtures and, in particular, to a melt blending process wherein a polycarbonate and another thermoplastic polymer are melt blended wherein each polymer has a melt viscosity essentially similar at the melt blending temperature and shear rate employed.

BACKGROUND OF THE INVENTION

Many ways have been attempted to incorporate other polymers with a polycarbonate resin in order to prepare polymer alloys. It has been found that such other polymers do not readily blend with polycarbonates since the resulting composition is not homogenous, separation of the individual polymers occurs, particularly when producing molded shapes, and agglomerations or balling of the polymers also occurs.

While dispersions of the polymers can be accomplished by blending the polymer in a fine particulate form, agglomeration occurs during the melt blending. Some successful blending or dispersions can be obtained by melt blending of very limited amounts of the polymer additive to the polycarbonate. Thus the effect or benefits of the additive polymer is not fully achieved.

DESCRIPTION OF THE INVENTION

It has now been surprisingly discovered that successful blends and dispersions of two different insoluble polymers can be achieved by the practice of this invention. More specifically, this invention is directed to a process of preparing a dispersion of one insoluble polymer into another and particularly, other thermoplastic polymers into a polycarbonate without the serious drawbacks previously encountered such as delamination, agglomeration or limited dispersions. The process of this invention involves melt blending the polycarbonate and other thermoplastic polymers wherein the melt viscosity of each polymer is within 50 percent of the melt viscosity of each at the melt blending temperature and shear rate. The amount of the thermoplastic polymer that can be dispersed in the polycarbonate can vary up to as high as 95 percent based on the weight of the total polymer composition.

The type of other polymers that can be employed in the practice of this invention is any thermoplastic polymer which has a melt viscosity within 50 percent of the melt viscosity of the corresponding polycarbonate at the melt blending temperature and shear rate employed. More particularly the other thermoplastic polymers are the polymers of ethylene, propylene, ethylene-ethyl acrylate copolymer, ethylene-propylene copolymer and other copolymers of ethylene with monomers copolymerizable with ethylene to produce a polymer meeting the criteria of the melt viscosity requirement. Other types of polymer employed in the practice of this invention with the polycarbonate are polymers of a butadiene, a vinyl aromatic hydrocarbon and an alkenyl cyanide and/or an acrylate. Also included are the polymers of an alkenyl cyanide and a vinyl aromatic hydrocarbon. Other polymers are the high impact polystyrene such as those prepared by polymerizing styrene monomer in the presence of polybutadiene. Typical of the above polymers are the acrylonitrile - butadiene-styrene terpolymers, styrene-acrylonitrile copolymers and styrene-butadiene random and black copolymers having at least 70 weight percent of styrene in the polymer.

The polycarbonate employed herein can be those polycarbonates prepared by reacting a dihydric phenol with a carbonate precursor in the presence of an acid acceptor either in an organic liquid medium or in an aqueous caustic system employing therein an organic solvent which is a solvent for the polycarbonate so produced. The dihydric phenols that can be employed herein to prepare the polycarbonate of this invention are bisphenols such as bis(4-hydroxyphenyl)methane, 2,2 - bis(4-hydroxyphenyl) propane, 2,2-bis(4-hydroxy-3-methylphenyl) propane, 4,4-bis(4-hydroxyphenol) heptane, 2,2-bis(4-hydroxy-3,5-dichlorophenyl) propane, 2,2-bis(4-hydroxy-3,5-dibromophenyl) propane, etc., dihydric phenol ethers such as bis(4-hydroxyphenyl) ether, bis(3,5-dichloro-4-hydroxyphenyl) ether, etc., dihydroxydiphenols such as p,p'-dihydroxyphenyl, 3,3'-dichloro - 4,4'-dihydroxydiphenyl, etc. dihydroxyaryl sulfones such as bis(4-hydroxyphenyl) sulfone, bis(3,5-dimethyl-4-hydroxyphenyl) sulfone, etc., dihydroxy benzenes, resorcinol, hydroquinone, halo- and alkyl-substituted dihydroxy benzenes such as 1,4-dihydroxy-2-chlorobenzene, 1,4-dihydroxy-2,5-dichlorobenzene, 1,4-dihydroxy-3-methylbenzene, etc., and dihydroxy diphenyl sulfoxides such as bis(4-hydroxyphenyl) sulfoxide, bis(3,5-dibromo-4-hydroxyphenyl) sulfoxide, etc. A variety of additional dihydric phenols are also available to provide carbonate polymers and are disclosed in U.S. Pats. 2,999,835, 3,028,365 and 3,153,008, It is of course possible to employ two or more different dihydric phenols or a copolymer of a dihydric phenol with glycol or with hydroxy or acid terminated polyester, or with a dibasic acid in the event a carbonate copolymer or interpolymer rather than a homopolymer is desired for use in the preparation of the aromatic carbonate polymers of this invention.

The carbonate precursors employed in the practice of this invention can be either a carbonyl halide or a bishaloformate. The carbonyl halides which can be employed herein are carbonyl chloride, carbonyl bromide and mixtures thereof. The bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride also known as phosgene is preferred.

As stated previously, the reaction may be carried out in the presence of an acid acceptor which may be either an organic or an inorganic compound. A suitable organic acid acceptor is a tertiary amine and includes such materials as pyridine, triethylamnie, dimethylaniline, tributylamine, etc. The inorganic acid acceptor may be one which can either be an hydroxide, a carbonate, a bicarbonate or a phosphate of an alkali or alkaline earth metal.

The molecular weight regulators which are also employed in carrying out the process for preparing the aromatic polycarbonate resins can be such molecular weight regulators as phenol, cyclohexanol, methanol, para-tertiarybutylphenol, para-bromophenol, etc. Preferably, para-tertiarybutylphenol is employed as the molecular weight regulator.

DESCRIPTION OF THE PREFERRED EMBODIMENT

The following examples are set forth herein to illustrate in more detail the preferred embodiment and to illustrate more clearly the principle and practice of this invention to those skilled in the art.

Example I

A polycarbonate, prepared by reacting essentially equimolar amounts of 2,2-bis(4-hydroxyphenyl) propane (bisphenol-A) and phosgene, is alloyed with four different samples of polyethylene each of which have a melt index of 1.5, 1.0, 0.2 and 0.05 respectively. The melt viscosity of each of the polyethylenes employed is then measured in an Instron Capillary Rheometer over a temperature range of 500–600° F. and a shear rate range of 10–1000 reciprocal seconds. The extruder employed herein is run at a speed on the screw so as to impart a shear rate of 100 reciprocal seconds in the metering section and at a temperature of 560° F. A polycarbonate of the above type has a melt viscosity of about 8000 poise at 100 reciprocal seconds and 560° F. Each of the polyethylenes employed have the following melt viscosities at these conditions of shear rate and temperature:

| Melt index: | Melt viscosity, poise |
|---|---|
| 1.5 | 1500 |
| 1.0 | 7000 |
| 0.2 | 8500 |
| 0.05 | 50,000 |

These are then blended separately with the polycarbonate in an amount of 3 weight percent based upon the total weight of the blend in an extruder at a temperature of about 560° F. and at a shear rate of 100 reciprocal seconds in the metering section of the extruder.

Each extrudate is comminuted into pellets and injection molded into test bars. The samples employing polyethylene having a melt viscosity of 1500 poise and 50,000 poise have poor gloss, visible agglomerates, poor dispersion of the polyethylene and delamination. The other test bars made with samples of polyethylene having a melt viscosity of 7000 poise and 8500 poise have good surface gloss, no agglomeration, good dispersion of the polyethylene and no delamination.

Example II

Example I is repeated except that 30 weight percent of polyethylene is employed herein.

The results obtained are essentially the same results obtained in Example I above.

Example III

Example I is repeated except that the polymers employed herein are an ABS polymer consisting of about 5 weight percent of acrylonitrile, 20 weight percent of butadiene and 75 weight percent of styrene.

The results obtained are essentially the same.

Example IV

Example III is repeated except that 80 weight percent of the ABS polymer is employed herein.

The results obtained are essentially the same.

As shown in the examples, the polymers added to the polycarbonate show excellent dispersion when the melt viscosities of the polymers so added are selected so as to minimize the melt viscosity differeneces at the melt blending temperature and shear rate employed.

It will thus be seen that the objects set forth above among those made apparent from the preceding description are efficiently attained, and since certain changes may be made in carrying out the above process and in the composition set forth without departing from the scope of this invention, it is intended that all matters contained in the above description shall be interpreted as illustrative and not in a limiting sense.

What is claimed is:

1. A process for preparing a polymer alloy consisting of an aromatic polycarbonate and a thermoplastic olefin polmer insoluble therein, which process involves melt blending said polycarbonate and up to about 95% by weight, based on the weight of the total polymer composition, of said thermoplastic olefin polymer each of which have melt viscosities within 50 percent of each polymer at the melt blending temperature and shear rate employed.

2. The process of claim 1 wherein the thermoplastic polymer is polyethylene.

3. The process of claim 1 wherein the thermoplastic polymer is an acrylonitrile-butadiene-styrene terpolymer.

4. The process of claim 1 wherein melt blending takes place in a screw extruder.

5. The process of claim 1 wherein the melt blending takes place in a screw injection molding machine.

6. The process of claim 1 wherein the aromatic polycarbonate is a polycarbonate of 2,2-bis(4-hydroxyphenyl) propane and a carbonyl chloride.

7. The product prepared by the process of claim 1.

References Cited

UNITED STATES PATENTS

| 3,655,825 | 4/1972 | Kato et al. | 260—873 |
| 3,239,582 | 3/1966 | Keskkula et al. | 260—873 |
| 3,477,978 | 11/1968 | Holub | 260—873 |
| 3,663,471 | 5/1972 | Schirmer et al. | 260—873 |

WILLIAM H. SHORT, Primary Examiner

E. WOODBERRY, Assistant Examiner